United States Patent Office 2,846,351
Patented Aug. 5, 1958

2,846,351

METHODS OF USING FATTY ACIDS TO REMOVE NEMATODES FROM LIVESTOCK

Armen C. Tarjan, Winter Haven, Fla., Vance J. Yates, Madison, Wis., and James L. Holmes, Vinita Park, Mo., assignors, by direct and mesne assignments, to Mallinckrodt Chemical Works, St. Louis, Mo., a corporation of Missouri No Drawing. Application May 16, 1956
Serial No. 585,173

8 Claims. (Cl. 167—53)

This invention relates to methods of treating livestock, and more particularly to methods of treating livestock for the elimination of ascarids and other intestinal nematodes.

Briefly, the invention is directed to the method of removing nematode parasites from nematode infected livestock which comprises administering to the livestock a nematoxic dose of a compound selected from the group consisting of aliphatic acids having not less than 7 and not more than 11 carbon atoms.

Among the several objects of this invention may be noted the provision of methods for treating livestock infected with parasitic intestinal nematodes; the provision of methods of this type for treating livestock such as poultry, for example, infected with ascarids and other intestinal nematodes; and the provision of methods of the class described which are safe, effective and economical. Other objects and features will be in part apparent and in part pointed out hereinafter.

The invention accordingly comprises the methods hereinafter described, the scope of the invention being indicated in the following claims.

Of the intestinal worms which are parasitic in livestock those which cause the greatest injury belong to the large class of nematodes or roundworms. This group of parasites includes ascarids (large roundworms), cecal worms, nodular worms, hookworms, stomach worms, threadworms, pinworms, and whipworms. While a number of anthelmintic compounds are known which are more or less effective in ridding infected livestock of these parasites, such treatments are not entirely satisfactory because of the highly toxic nature of most such compounds which makes them hazardous to the operator as well as to the animal being treated.

In accordance with the present invention, it has now been found that certain aliphatic carboxylic acids are toxic to ascarids but relatively non-toxic to human beings and livestock. When administered to infected livestock in suitable dosages, the ascarids are destroyed and eliminated without harm or distress to the host animal. It has also been found that these fatty acids are somewhat effective against other intestinal nematodes such as cecal worms. The aliphatic acids of the present invention are especially useful for ridding poultry of intestinal nematode parasites. The importance of nematodes as a factor in poultry disease is attested to by the voluminous literature on this subject.

The aliphatic carboxylic acids having a chain containing 7 to 11 carbon atoms have been found effective anthelmintic compounds for the purposes of the present invention. The chain may contain substituents such as lower alkyl substituents, and it may be cyclic rather than acyclic. The most effective compounds, however, appear to be the normal unsubstituted aliphatic acids. Both saturated and unsaturated acids are effective. Since caprylic acid and pelargonic acid have been found to possess maximum toxicity to nematodes, we prefer to use one or a combination of these acids. These aliphatic carboxylic acids have been found effective in treating livestock at dosages of, for example, 1 gram per pound of body weight and are tolerated by poultry at rates up to and including 3.5 grams.

The following examples illustrate the invention.

EXAMPLE 1

The effect of oral administration of pelargonic acid on the subsequent health of treated chickens presumably not infected with helminths was investigated as follows. Aqueous emulsions containing 10 parts of pelargonic acid and 3 parts of a polyoxyethylene glycol ester alkyl aryl sulfonate surfactant (sold under the trade designation "Agrimul GM") with and without 5 parts of corn oil, which had previously been shown not to alter the nematoxicity of the acid, were prepared along with control preparations containing the surfactant with and without corn oil. Appropriate amounts of each mixture were introduced orally into the crops of white Plymouth Rock hens so as to represent treatment at 1000, 500, 100, 50, 10, 5, and 1 mg. of actual pelargonic acid per pound weight of each bird. Prior to and 11 days after treatment each treated bird was weighed, along with 4 untreated control birds, so as to determine what the effects of treatment were on weight changes. None of the treatments was toxic to the chickens or resulted in abnormal weight fluctuation as compared to the untreated control birds.

EXAMPLE 2

It having been established that pelargonic acid at a rate of 1000 mg. per pound of body weight was not toxic when administered orally to chickens, a second experiment was conducted on a group of Rhode Island Red hens carrying helminth infections. Pure heptanoic, pelargonic, and undecylenic acids were applied orally to groups of 3 hens each at a rate of 1000 mg. per pound of body weight. Four birds remained untreated as controls. Each group of treated hens was kept in a cage with a wide mesh wire floor and underlying pan to facilitate collection of droppings which were passed through 10, 25 and 60 mesh U. S. standard screens for recovery of the *Ascaridia galli* Schrank, which were present. Inspection of residue on the 25 and 60 mesh screens under a dissecting microscope indicated that cecal worms, *Heterakis gallinae* Gmelin were also present. The following table shows the number of ascarids recovered from fecal droppings of each group of birds for 4 successive days after treatment.

Table I

| Treatment | Rate per lb. of bird, milligrams | No. of worms passed on each of 4 days after treatment | | | | Total no. of worms passed |
|---|---|---|---|---|---|---|
| | | 1 | 2 | 3 | 4 | |
| Heptanoic acid | 1,000 | 31 | 19 | 0 | 0 | 50 |
| Pelargonic acid | 1,000 | 5 | 6 | 6 | 3 | 20 |
| Undecylenic acid | 1,000 | 2 | 26 | 0 | 0 | 28 |
| Controls | | 0 | 0 | 0 | 0 | 0 |

Three days after the last fecal samples were collected the birds were weighed and then sacrificed. The weights of each treated bird prior to treatment and immediately preceding slaughter compared with those of control birds showed that no abnormal weight changes had occurred in the treated birds. The contents of the intestines of each group of birds was screened and the ascarids counted. The following table shows the number of ascarids recovered from each group of sacrificed birds.

Table II

| Treatment | Rate per lb. of bird, milligrams | Total worms recovered |
|---|---|---|
| Heptanoic acid | 1,000 | 6 |
| Pelargonic acid | 1,000 | 8 |
| Undecylenic acid | 1,000 | 2 |
| Controls | | 24 |

Microscopic examination of all samples also revealed the presence of tapeworms, cecal worms, and *Capillaria sp.* in most of the chickens. All of the acids used had definite anthelmintic action against ascarids and cecal worms, as shown by the results listed above.

EXAMPLE 3

Heptanoic acid was administered orally to duplicate white Plymouth Rock hens at each of the following rates: 1.5, 2.0, 2.5, 3.0 and 3.5 grams of acid per lb. of bird. Inspection of the birds up to a month after treatment showed no toxic effects.

While the fatty acid compounds may be used alone and introduced directly into the livestock infected with intestinal nematodes, it sometimes is more convenient to use them in the form of emulsions or suspensions containing a convenient concentration of the fatty acid compound. Such emulsions or suspensions can then be added to the drinking water or feed of the livestock. This method is usually more convenient and less time-consuming than treating each individual animal, especially when large flocks of poultry must be treated for intestinal nematodes.

Suitable emulsions can be prepared with the aid of surfactants, preferably nonionic surfactants such as polyoxyethylene sorbitan monopalmitates, viscosity increasing agents such as glycerine, urea and d-sorbitol, and stabilizers, such as gum tragacanth. The following examples illustrate several satisfactory compositions of this type.

EXAMPLE 4

Polyoxyethylene sorbitan monopalmitate (4 g.) (sold under the trade designation "Tween 40") and glycerine (8 g.) were dissolved in water (80 ml.) and gum tragacanth (1 g.) was added as a stabilizer. The mixture was stirred vigorously for 45 minutes to suspend the stabilizer. Stirring was then slowed to a moderate rate and pelargonic acid (20 g.) was slowly added over a period of 15–20 minutes. The resulting emulsion was finally put through a hand-operated homogenizer six times. The resulting emulsion was stable under ordinary storage conditions for at least six months.

EXAMPLE 5

An emulsion similar to that described in Example 4 was prepared except that the amount of polyoxyethylene sorbitan monopalmitate was increased to 6 g. This emulsion was also stable.

EXAMPLE 6

Polyoxyethylene sorbitan monopalmitate (2 g.), d-sorbitol (16 g.), and glycerine (8 g.) were dissolved in water (70 ml.) and gum tragacanth (1 g.) was added as a stabilizer. The mixture was stirred vigorously for 45 minutes to suspend the stabilizer, and then stirring was slowed to a moderate rate while pelargonic acid (20 g.) was slowly added over a period of 15–20 minutes. The emulsion was finally put through a hand-operated homogenizer six times. This emulsion was exceptionally satisfactory and was stable under ordinary conditions for at least six months.

EXAMPLE 7

Urea (16 g.) was dissolved in water (60 ml.) and gum tragacanth (1 g.) was added as a stabilizer. The mixture was stirred vigorously for 45 minutes to suspend the stabilizer. Stirring was then slowed to a moderate rate and pelargonic acid (20 g.) was added slowly over a period of 15–20 minutes. This emulsion was not homogenized further, but was nevertheless stable.

EXAMPLE 8

Polyoxyethylene sorbitan monopalmitate (6 g.), sorbitan monopalmitate (2 g.) (a commercial nonionic surfactant sold under the trade designation "Span 40"), and glycerine (8 g.) were dissolved in water (100 ml.) and gum tragacanth (1 g.) was added as a stabilizer. The mixture was stirred vigorously for 45 minutes to suspend the stabilizer. Stirring was then slowed to a moderate rate and pelargonic acid (40 g.) was added slowly over a period of 15–20 minutes. The resulting emulsion was finally put through a hand-operated homogenizer six times after which it was stable under ordinary storage conditions for at least six months.

Emulsifiable concentrates of the fatty acid compounds of the present invention are particularly useful since many of the problems associated with storing finished emulsions are thereby avoided. These concentrates consist essentially of solutions of the fatty acid compound, and a surfactant dissolved in a suitable solvent such as ethylene glycol monomethyl ether (sold under the trade designation methyl "Cellosolve") and isoproply alcohol. The following examples illustrate useful compositions of this type.

EXAMPLE 9

Polyoxyethylene sorbitan monopalmitate (10 g.) was dissolved in isopropyl alcohol with vigorous stirring. After the surfactant had dissolved pelargonic acid (10 g.) was then slowly added with stirring.

A fine emulsion resulted when this concentrate was poured slowly with stirring into water (500 ml.)

EXAMPLE 10

A concentrate similar to that described in Example 9 was prepared except that ethylene glycol monomethyl ether was substituted for isopropyl alcohol.

It is to be understood that the method of the present invention is useful for the treatment of livestock other than poultry.

In view of the above it will be seen that the several objects of the invention are achieved and other advantageous results attained.

As various changes could be made in the above methods without departing from the scope of the invention, it is intended that all matter contained in the above description shall be interpreted in an illustrative and not in a limiting sense.

We claim:

1. The method of removing nematode parasites from nematode infected livestock which comprises administering to said livestock a nematoxic dose of compound selected from the group consisting of aliphatic acids having not less than 7 and not more than 11 carbon atoms.

2. The method of removing nematode parasites from nematode infected livestock which comprises orally administering to said livestick not less than approximately 1 gram per pound of body weight of a compound selected from the group consisting of aliphatic acids having not less than 7 and not more than 11 carbon atoms.

3. The method of removing nematode parasites from nematode infected livestock which comprises orally administering to said livestock an oral dosage of from approximately 1 to 3.5 grams per pound of body weight of a compound selected from the group consisting of aliphatic acids having not less than 7 and not more than 11 carbon atoms.

4. The method of removing nematode parasites from nematode infected livestock which comprises administering a nematoxic dose of caprylic acid to said livestock.

5. The method of removing nematode parasites from nematode infected livestock which comprises administering a nematoxic dose of pelargonic acid to said livestock.

6. The method of removing nematode parasites from nematode infected livestock which comprises administering a nematoxic dose of capric acid to said livestock.

7. The method of removing nematode parasites from nematode infected livestock which comprises administering a nematoxic dose of undecylenic acid to said livestock.

8. The method of removing nematode parasites from nematode infected livestock which comprises administering a nematoxic dose of heptanoic acid to said livestock.

References Cited in the file of this patent

FOREIGN PATENTS 681,670   Germany _____ Sept. 28, 1939

OTHER REFERENCES

Harwood: J. A. V. M. A., vol. 97, September 1940, pp. 248 and 249.